US006493239B2

(12) United States Patent
Ando et al.

(10) Patent No.: US 6,493,239 B2
(45) Date of Patent: Dec. 10, 2002

(54) ARRANGEMENT OF MEMORY-CARD ACCOMODATING PORTIONS IN A RECORDING AND REPRODUCING APPARATUS

(75) Inventors: Kunihiro Ando, Tokyo (JP); Satoshi Watanabe, Tokyo (JP)

(73) Assignee: Clarion Co., Ltd., Tokyo (JP)

( * ) Notice: Subject to any disclaimer, the term of this patent is extended or adjusted under 35 U.S.C. 154(b) by 0 days.

(21) Appl. No.: 09/747,031

(22) Filed: Dec. 26, 2000

(65) Prior Publication Data

US 2001/0036067 A1 Nov. 1, 2001

(30) Foreign Application Priority Data

Dec. 27, 1999 (JP) .......................................... 11-369586

(51) Int. Cl.7 ................................................. H05K 7/14
(52) U.S. Cl. ...................... 361/796; 361/752; 361/753; 439/159

(58) Field of Search ................................. 361/683–686, 361/752, 753, 798, 814; 439/152–160; 711/114

(56) References Cited

U.S. PATENT DOCUMENTS 5,299,089 A * 3/1994 Lwee .......................... 361/684
6,223,250 B1 * 4/2001 Yokono ....................... 711/114

* cited by examiner

*Primary Examiner*—David L. Talbott
*Assistant Examiner*—Tuan Dinh
(74) *Attorney, Agent, or Firm*—McGinn & Gibb, PLLC

(57) ABSTRACT

An arrangement of memory-card accommodating portions in a recording and reproducing apparatus includes a plurality of card slots for respectively accommodating memory cards capable of recording and reproducing an audio or image signal disposed adjacent to each other in a mutually overlapping relation, and eject buttons for ejecting the memory cards disposed in individual correspondence with the card slots. A set of at least two of the card slots are arranged so that the memory cards are disposed in parallel with each other.

9 Claims, 2 Drawing Sheets

PRIOR ART

ARRANGEMENT OF MEMORY-CARD ACCOMODATING PORTIONS IN A RECORDING AND REPRODUCING APPARATUS

BACKGROUND OF THE INVENTION

The present invention relates to an arrangement of memory-card accommodating portions in a recording and reproducing apparatus, and more particularly to an arrangement of memory-card accommodating portions having a plurality of card slots for accommodating the memory cards.

An electronic apparatus such as audio equipment mounted in a console panel of a vehicle has a card slot for accommodating a memory card, and there is a type of this apparatus in which audio information and image information in the memory card are recordable and reproducible. In another type of this apparatus, a plurality of card slots are provided to allow desired information to be recordable and reproducible from among a greater number of items of information.

FIG. 4 is a schematic diagram illustrating the arrangement of card entrance sides of memory-card accommodating portions in the above-described conventional recording and reproducing apparatus, FIG. 4A illustrates in a perspective view one example of arrangement of the memory cards including the aforementioned card slots and eject buttons, and FIG. 4B schematically illustrates another example of arrangement of the memory cards.

Referring to FIG. 4A, reference numeral 1 denotes a card receiving frame. A card slot 2 for receiving the memory card (not shown) is formed in the card receiving frame 1, and is mounted on each printed circuit board 3 provided in this recording and reproducing apparatus. A plurality of card slots 2 are provided in the recording and reproducing apparatus, are disposed adjacent to each other in a vertically aligned state, and are arranged so that the memory cards can be accommodated therein with their entire surface areas opposing each other. To eject the memory cards, eject buttons 4 which are operated by being pressed are provided in individual correspondence with the respective card slots. The eject buttons 4 are disposed adjacent to each other in a vertically aligned state in the vicinities of the respective ends of the mutually opposing sides of the card slots 2.

In FIG. 4B, to eject the card in a card slot 2A, one eject button 5A is disposed in the vicinity of one end side of each of card receiving frames 1A (card slot 2A) and 1B (card slot 2B) so as to commonly correspond to each of these card slots. Meanwhile, another eject button 5B is disposed in the vicinity of the other end side to eject the card in the card slot 2B.

In the apparatus in which, as shown in FIG. 4A, the card slots are arranged in a vertically aligned state, and the eject buttons are arranged in a vertically aligned state in the vicinity of each end in the vicinities of the respective ends of the mutually opposing sides of the card slots, since the eject buttons are located at positions which are close to each other, there has been a possibility of another eject button being pressed erroneously at the same time when a desired ejecting operation is performed, so that this arrangement has not been desirable.

In addition, in the apparatus in which, as shown in FIG. 4B, the card slots are arranged in the same way as described above, but the eject buttons are respectively disposed in the vicinities of one end side and the other end side of the card slots and one eject button is positioned so as to commonly correspond to the card slots, since the correspondence with the individual card slots is not necessarily clear, there has been a possibility of erroneous operation, so that this arrangement has not been desirable, either.

SUMMARY OF THE INVENTION

To overcome the above-described problems, an object of the invention is to render the operational efficiency of memory cards satisfactory by improving the arrangement o the memory-card accommodating portions in the recording and reproducing apparatus.

To attain the above object, in accordance with aspect 1 of the invention, there is provided an arrangement of memory-card accommodating portions in a recording and reproducing apparatus in which a plurality of card slots for respectively accommodating memory cards are disposed adjacent to each other in a mutually overlapping relation, and eject. buttons for ejecting the memory cards are disposed in individual correspondence with the card slots, characterized in that a set of at least two of the card slots are arranged such that the memory cards are disposed in parallel with each other and are accommodated in a state in which at least partial areas of surfaces of the memory cards oppose each other, and the eject buttons are arranged at positions which are respectively adjacent to the plurality of card slots in a unique manner and which do not overlap in a direction parallel to the surface of the inserted memory card, in order to prevent the eject buttons from being disposed close to each other.

In the invention according to aspect 2, the card slots according to aspect 1 for forming the set are arranged such that the memory cards are accommodated in a state in which only partial areas of the surfaces of the memory cards oppose each other, in order to prevent the eject buttons from being disposed close to each other.

In the invention according to aspect 3, the card slots according to aspect 1 for forming the set are arranged such that the memory cards are accommodated in a state in which entire areas of the surfaces of the memory cards oppose each other, and the eject buttons are respectively disposed in vicinities of one end side and another other end side of the card slots in a uniquely adjacent fashion, in order to prevent the eject buttons from being disposed close to each other.

In the invention according to aspect 4, the eject buttons according to aspect 3 are respectively disposed on sides which are away from mutually opposing sides of the card slots in correspondence with the card slots which form the set, in order to prevent the eject buttons from being disposed close to each other.

DETAILED DESCRIPTION OF THE PREFERRED EMBODIMENTS

Figure 1:
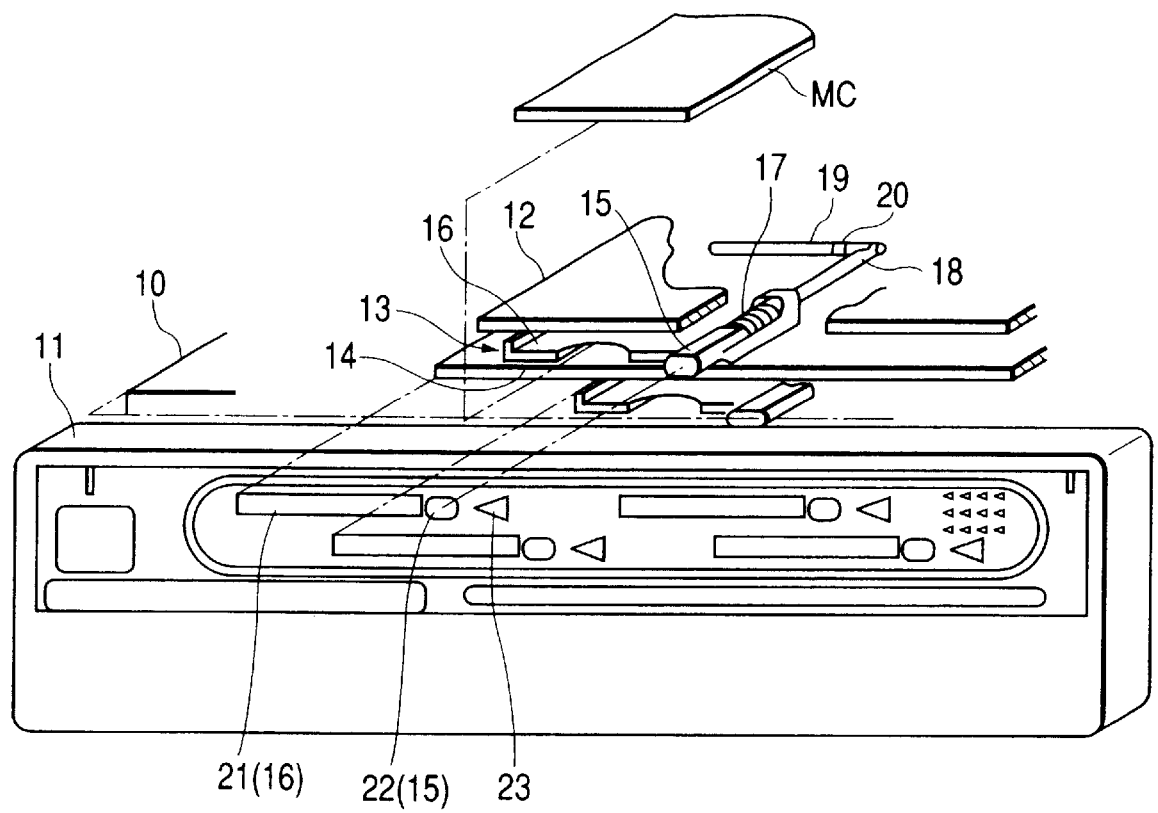
FIG. 1 is an exploded perspective view illustrating memory-card accommodating portioins a recording and reproducing apparatus in accordance with an embodiment of the invention.

Referring now to the accompanying drawings, a description will be given of a preferred embodiment of the invention. FIG. 1 is a partly fragmentary exploded perspective view illustrating memory-card accommodating portions in a recording and reproducing apparatus in accordance with an embodiment of the invention. In the drawing, reference numeral 10 denotes a casing of the recording and reproducing apparatus which is mountable in a console panel of a vehicle. Numeral 11 denotes an operation panel attached to the front surface of the casing 10, and if an unillustrated escutcheon is opened, the operation panel 11 is exposed to allow a memory card, which will be described later, to be loaded into or removed from the operation panel 11. Numeral 12 denotes a printed circuit board, and the printed circuit boards 12 are disposed in parallel with each other with an interval provided between upper and lower printed circuit boards, and are attached to the casing 10. Numeral 13 denotes a memory-card accommodating portion. The memory-card accommodating portion 13 has an eject button 15 in a card-receiving frame 14, and two memory-card accommodating portions 13 are mounted on a lower surface of each printed circuit board 12. The eject button 15 ejects a memory card MC by the operation of pressing the eject button 15.

The card receiving frame 14 forms a card slot 16 in cooperation with the printed circuit board 12 to allow the memory card MC to be inserted in the card slot 16. A set of two vertically adjacent card receiving frames 14 (card slots 16) are arranged such that the memory cards MC in the respectively inserted state are disposed in parallel with each other and are accommodated in a state in which at least partial areas of the surfaces of the memory cards MC oppose each other. In the embodiment illustrated in the drawing, the memory cards are arranged such that they are accommodated in the state in which only partial areas of the surfaces of the memory cards MC oppose each other.

The eject buttons 15 are arranged at positions which are respectively adjacent to the card slots 16 in a unique manner and which do not overlap in a direction parallel to the surface of the inserted memory card MC, and the eject buttons 15 are made to correspond to the respective card slots 16 individually. In the embodiment illustrated in the drawing, the interval between the left end of the eject button 15 and the right end of the adjacent card slot 16 is set to be identical for the respective adjacent pairs.

Reference numeral 17 denotes a return spring for returning the eject button 15 to its home position. The return spring 17 is formed of a compression spring and is disposed in the inner space of the card-receiving frame 14. An arm 18 extends from a rear end of the eject button 15, and an eject lever 19 is pivotally attached to its distal end. The eject lever 19 is pivotally supported on a fulcrum 20, and when the eject button 15 operated by being pressed, a rear end of the memory card MC is pressed, thereby ejecting the memory card MC.

The operation panel 11 has a card receiving portion 21 for receiving a front end portion of the card receiving frame 14 and an eject button portion 22 for receiving the eject button 15 in a state in which this recording and reproducing apparatus has been assembled. Numeral 23 denotes a card indicator, and the card indicator 23 is provided in correspondence with each card-receiving portion 21. When the memory card MC is loaded in the card receiving portion 21, the card indicator 23 is lit for display, and during recording or reproduction the card indicator 23 flashes for display.

In the above-described construction, when the memory card MC is inserted into the card receiving portion 21 (card slot 16) and is pushed in up to a predetermined position, recording or reproduction using the memory card MC becomes possible. Then, if the eject button 15 in the eject button portion 22 is operated by being pressed, the memory card MC is ejected. Since the eject buttons 15 are sufficiently spaced apart from each other as shown in the drawing, it is made difficult for the operator's finger, which pressed one eject button 15, to touch another eject button 15. Thus, even if the memory card MC is loaded in an adjacent card slot 16, there is no possibility of this memory card MC being ejected by mistake.

Figure 2:
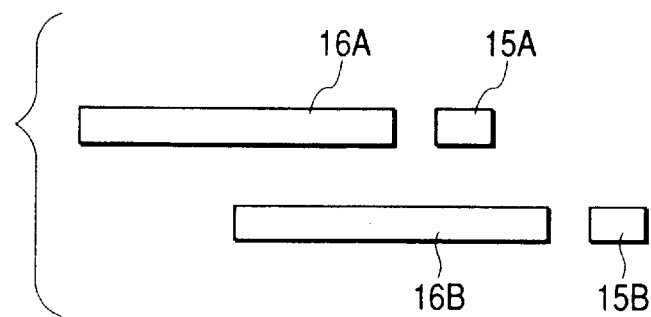
FIG. 2 is schematic diagram reillustrating the arrangement of the memory-card accommodating portions shown in FIG. 1 as the embodiment of the invention.

FIG. 2 is a schematic diagram illustrating the arrangement of the memory-card accommodating portions in accordance with the embodiment of the invention. In FIG. 2, the same arrangement as the one shown in FIG. 1 is illustrated. To illustrate the embodiments in FIGS. 2 and 3, the card slots 16 and the eject buttons 15 in FIG. 1 are used. In FIG. 2, reference character A is suffixed to the reference numerals of the parts on the upper side and reference character B to the reference numerals of the parts on the lower side for convenience' sake.

Figure 3A:
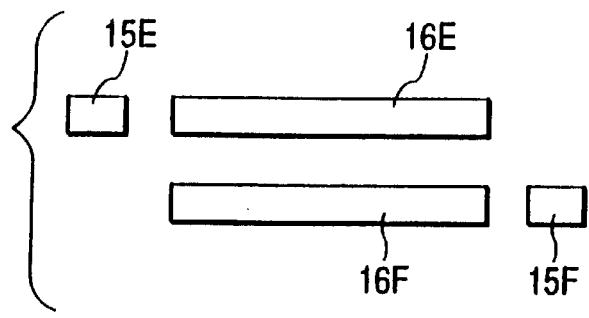
FIGS. 3a and 3b are schematic diagrams illustrating another arrangement of the memory-card accommodating portions in accordance with other embodiment of the invention.

FIG. 3 is a schematic diagram illustrating the arrangement of the memory-card accommodating portions in accordance with another embodiment of the invention. In the drawing, card slots 16E and 16F, which form a pair in a vertical direction, are arranged so as to be accommodated in a state in which entire areas of the surfaces of the memory cards oppose each other. In FIG. 3A, an eject buttons 15E is disposed on a left-end side of the card slot 16E, while an eject button 15F is disposed on a right-end side of the card slot 16F, the eject buttons 15E and 15F being thus arranged in a uniquely adjacent fashion. Accordingly, in the same way as in FIG. 1 or 2, there is no possibility of another memory card MC being ejected by mistake in the ejecting operation.

Figure 3B:
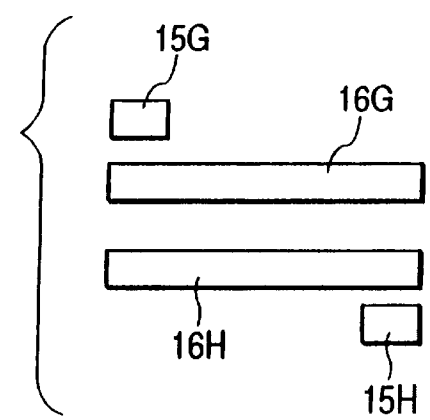
Figure 4A:
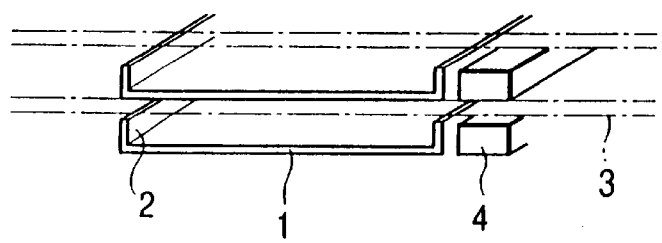
FIGS. 4a and 4b are schematic diagrams illustrating an example of the arrangement of card entrance sides of memory-card accommodating portions in a conventional recording and reproducing apparatus.
Figure 4B:
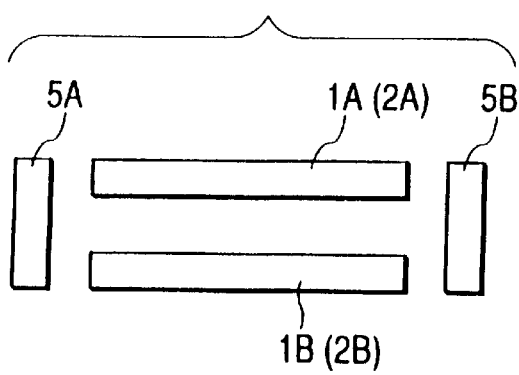

In FIG. 3B, one eject button 15G is disposed uniquely adjacent to a left end of an upper side of a card slot 16G, while an eject button 15H is disposed uniquely adjacent to a right end of a lower side of a card slot 16H. Accordingly, in the same way as in FIG. 1 or 2, there is no possibility of another memory card MC being ejected by mistake in the ejecting operation.

It should be noted that although, in the above-described embodiments, a description has been given of the arrangement in which the pair of card receiving frames 14 are respectively mounted on the two printed circuit boards 12, a similar function can be obtained if two memory cards MC are made insertable in two upper and lower stages into the card receiving frame mounted on a single printed circuit board 12, and the slots and the eject buttons are provided in the operation panel 11.

In addition, although, in the above-described embodiments, a description has been given of the case where the pair of card receiving frames 14 are arranged in a vertically overlapping manner, the invention is applicable to a case where they are arranged in a horizontally overlapping manner.

In accordance with the invention, the card slots which together form a set are arranged such that the memory cards are disposed in parallel with each other and are accommodated in a state in which at least partial areas of surfaces of the memory cards oppose each other, and the eject buttons are arranged at positions which are respectively adjacent to the card slots in a unique manner and which do not overlap in a direction parallel to the surface of the inserted memory card. Hence, there is no possibility of another eject button being operated by mistake when a required eject button is operated.

What is claimed is:

1. An arrangement of memory-card accommodating portions in a recording and reproducing apparatus, comprising:

a plurality of card slots for respectively accommodating memory cards capable of recording and reproducing an audio or image signal disposed adjacent to each other in a mutually overlapping relation; and eject buttons for ejecting the memory cards disposed in individual correspondence with the card slots, wherein a set of at least two of said card slots are arranged so that the memory cards are disposed in parallel with each other, wherein said eject buttons are arranged at positions which are respectively adjacent to said plurality of card slots in a unique manner without overlapping in a direction parallel to the surfaces of the memory card, and wherein said eject buttons are respectively disposed on sides which are away from mutually opposing sides of said card slots in correspondence with said card slots which form the set of at least two of said card slots.

2. The arrangement of memory-card accommodating portions in a recording and reproducing apparatus according to claim 1, wherein said card slots forming the set of at least two of said card slots are arranged so that the memory cards comprise only partial areas of the surfaces of the memory cards which oppose each other.

3. The arrangement of memory-card accommodating portions in a recording and reproducing apparatus according to claim 1, wherein said card slots forming the set of at least two of said card slots are arranged so that the memory cards comprise entire areas of the surfaces of the memory cards which oppose each other.

4. The arrangement of memory-card accommodating portions in a recording and reproducing apparatus according to claim 1, wherein an interval between individual ones of said eject buttons and a corresponding card slot is the same for all of said eject buttons.

5. The arrangement of memory-card accommodating portions in a recording and reproducing apparatus according to claim 1, further comprising:

a card indicator provided in correspondence with each of said plurality of card slots.

6. The arrangement of memory-card accommodating portions in a recording and reproducing apparatus according to claim 5, wherein said card indicator is lit for display when the memory card is loaded in said card slot.

7. The arrangement of memory-card accommodating portions in a recording and reproducing apparatus according to claim 5, wherein said card indicator flashes for display during recording and reproduction.

8. The arrangement of memory-card accommodating portions in a recording and reproducing apparatus comprising:

a plurality of card slots for respectively accommodating memory cards capable of recording and reproducing an audio or image signal disposed adjacent to each other in a mutually overlapping relation; and eject buttons for ejecting the memory cards disposed in individual correspondence with the card slots, wherein a set of at least two of said card slots are arranged so that the memory cards are disposed in parallel with each other, and wherein said card slots forming the set of at least two of said card slots are arranged so that the memory cards comprise only partial areas of the surfaces of the memory cards which oppose each other.

9. The arrangement of memory-card accommodating portions in a recording and reproducing apparatus according to claim 8, wherein said eject buttons are respectively disposed adjacent one end side and another end side of said card slots.

* * * * *